United States Patent [19]

Katou et al.

[11] Patent Number: 4,658,929
[45] Date of Patent: Apr. 21, 1987

[54] METHOD AND APPARATUS FOR AUTOMATIC TRANSMISSION CRUISE CONTROL

[75] Inventors: Yuuji Katou; Kiyoshi Yoshida, both of Zama, Japan

[73] Assignee: Nissan Motor Co., Ltd., Yokohama, Japan

[21] Appl. No.: 660,961

[22] Filed: Oct. 15, 1984

[30] Foreign Application Priority Data

Oct. 15, 1983 [JP] Japan .................................. 58-193011

[51] Int. Cl.[4] ............................................ B60K 31/00
[52] U.S. Cl. ...................................... 180/175; 74/868; 180/178
[58] Field of Search ............... 180/179, 178, 177, 176, 180/175; 74/866, 868, 877, 878, 336 R, 869; 364/426, 431.07, 424.1

[56] References Cited

U.S. PATENT DOCUMENTS

| 3,713,351 | 1/1973 | Sakakibara et al. | 74/645 |
| 3,732,755 | 5/1973 | Beig et al. | 74/866 |
| 4,421,192 | 12/1983 | Ito et al. | 180/179 |
| 4,463,822 | 8/1984 | Tanigawa et al. | 180/177 |
| 4,506,752 | 3/1985 | Hara et al. | 74/866 |
| 4,560,024 | 12/1985 | Noda et al. | 180/176 |
| 4,563,918 | 1/1986 | Sugano | 74/869 |

Primary Examiner—David M. Mitchell
Attorney, Agent, or Firm—Schwartz, Jeffery, Schwaab, Mack, Blumenthal & Evans

[57] ABSTRACT

In order to prevent hunting between a selected gear ratio (e.g. overdrive) and the next lower one when a vehicle ascends a slope or incline under "cruise control", the degree to which which the cruise control arrangement (viz., the automatic vehicle speed control device (ASCD)) can open the throttle valve is limited to a value at which the transmission control circuit (e.g. hydraulic) will induce a downshaft. Upon a downshift being necessary to maintain vehicle speed, upshift is inhibited either for a predetermined period of time or until the load which necessitated the downshaft disappears.

10 Claims, 7 Drawing Figures

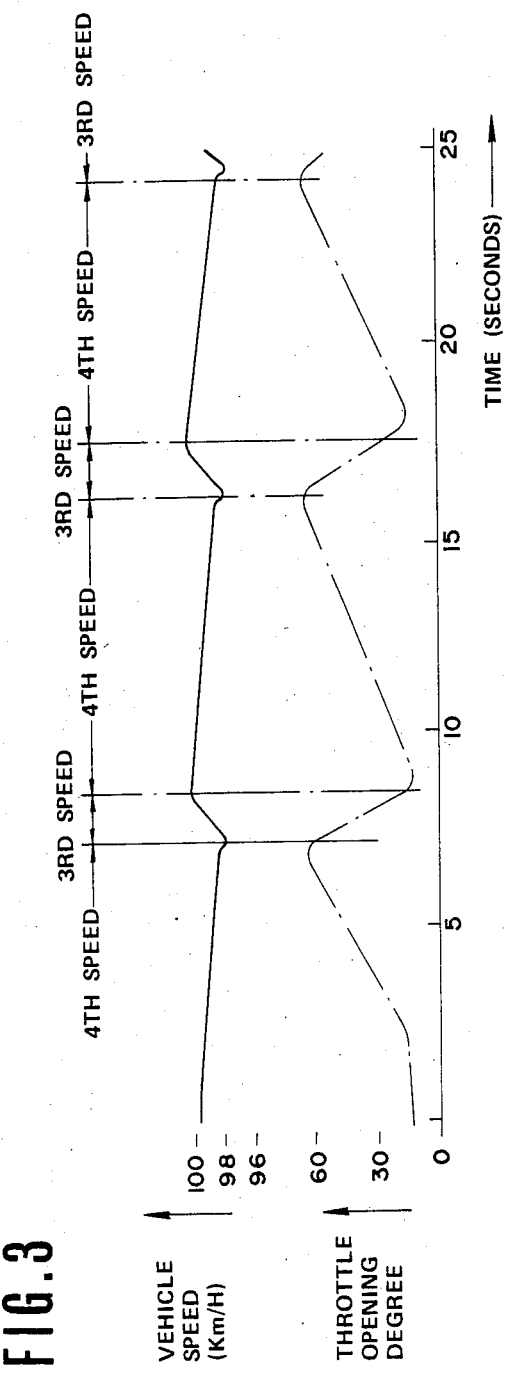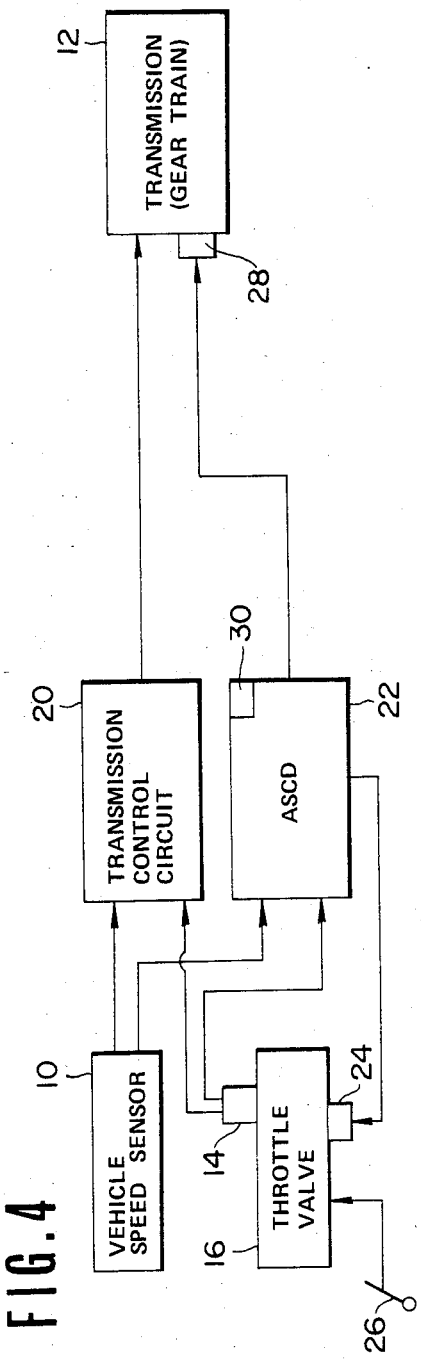

METHOD AND APPARATUS FOR AUTOMATIC TRANSMISSION CRUISE CONTROL

BACKGROUND OF THE INVENTION

1. Field of the Invention

The present invention relates generally to an automatic automotive transmission and more specifically to an improved cruise control arrangement therefor which obivates frequent downshift/upshift hunting upon the vehicle ascending a slope or the like.

2. Description of the Prior Art

FIG. 1 of the drawings shows previously proposed transmission control arrangement (disclosed on pages 80-81 of Datsun Blue Bird Service Journal No. 474 October 1982 published by Nissan Motor Co.). In this arrangement a transmission control circuit 1 (e.g. a hydraulic spool valve control circuit) receives inputs from a vehicle speed sensor 2 and a throttle position sensor 3 which outputs a signal indicative of the opening degree of the throttle valve 4 of the engine associated with the transmission 5. In this system the transmission 5 is comprised of planetary gear sets, hydraulic clutches and brakes and capable of producing four forward speeds. The system further includes an automatic vehicle speed control device (ASCD) 6 which also receives input from the vehicle speed sensor 2, and a throttle valve actuator 7 which controls the position of the throttle valve 4 in place of the normal manual control, once the system has entered so the called "cruise control" mode of operation.

However, this system has tended to suffer from a drawback in that the transmission control circuit and the automatic vehicle speed control device (ASCD) are independently arranged and accordingly function independently of each other, whereby when the vehicle in which the above described transmission system is mounted is operated under "cruise control" and ascends a slope the inclination of which is sufficient to reduce the vehicle speed, the vehicle speed control device opens the throttle of the engine to the point whereat the transmission control circuit, in accordance with its own control schedule, induces a 4-3 downshift irrespective of the ASDC issuing a command to this effect. Viz., as shown in FIG. 2, if the speed falls below the vehicle speed selected to be maintained by the cruise control, a relatively small increase in the opening of the throttle valve reaches the threshold at which the transmission control circuit will, according to its independent control, induce a 4-3 downshift. Subsequently, as the vehicle speed increases due to the downshift, the vehicle speed soon returns to the preselected one. However, to prevent vehicle speeds in excess of the desired value, the automatic vehicle speed control device begins closing the throttle valve. Accordingly, the threshold at which a 3-4 upshift is induced by the transmission control circuit is soon reached and the transmission is upshifted.

If the increased load which originally induces the vehicle speed reduction is still present, viz., the vehicle is still ascending the slope, the vehicle speed begins to reduce again. This induces hunting between third and fourth speeds to occur at approximately 3-4 second intervals as shown in FIG. 3.

This, while maintaining the desired vehicle speed tends to be highly disconcerting to the vehicle passengers.

To overcome this hunting problem it has been arranged for (as shown in FIG. 1) the transmission to issue a signal to the automatic vehicle speed control device when the transmission control circuit induces a 4—3 downshift. This signal triggers a timer in the ASCD and causes the latter to energize a solenoid in the transmission which inhibits a 3-4 upshift for a preselected period of 10 to 20 seconds (for example).

This while overcoming the hunting problem incurs the drawback that the control schedule according to which the transmission is controlled is extremely complex due to the essentially independent natures of the transmission control circuit and the vehicle speed control device and the interaction which inherently occurs therebetween.

SUMMARY OF THE INVENTION

It is an object of the present invention to provide an automatic automotive transmission which has a cruise control and which does not undergo the above mentioned speed ratio hunting phenomenon and which features a simple control schedule.

In brief, the above object is achieved by an arrangement wherein, in order to prevent hunting between a selected gear ratio (e.g. overdrive) and the next lower one when a vehicle ascends a slope or incline under "cruise control", the degree to which which the cruise control arrangement can open the throttle valve is limited to a value which is lower than that at which the transmission control circuit (e.g. hydraulic spool valve circuit) will induce a downshift. Upon a downshift being necessary to maintain vehicle speed, upshift is inhibited either for a predetermined period of time or until the load which necessitated the downshift disappears.

More specifically, the present invention in its broadest aspect takes the form of a method of automatically controlling the speed of an automotive vehicle having an engine and a transmission, at a preselected target value, comprising the steps of: (a) using a vehicle speed control device to vary the opening degree of a throttle valve associated with the engine in a manner to maintain the preselected target speed, (b) limiting the degree to which the vehicle speed control device opens the throttle valve to a predetermined maximum opening value which is less than that which will cause the transmission control circuit of the transmission to induce a downshift if the vehicle speed falls below the target level, (c) using the vehicle speed control device to induce a downshift from a predetermined gear ratio to the next lower one, if the load on the engine increases to a level whereat the vehicle speed cannot be maintained at the target speed without opening the throttle valve beyond the maximum opening value, and (d) maintaining the downshift until a predetermined phenomenon occurs.

A more specific aspect of the invention comes in the form of an automotive vehicle including an engine a throttle valve, a throttle valve position sensor for generating a first signal indicative of the position of the throttle valve, a vehicle speed sensor for generating a second signal indicative of the speed of the vehicle, an automatic transmission having a plurality of forward speed ratios and a control circuit which controls the shifting between the plurality of forward speeds in response to the first and second signals, and selectively operable vehicle speed control means which is responsive to the first and second signals for: (a) moving the throttle valve in a manner to maintain the vehicle speed essentially constant at a preselected target value, (b) maintaining the opening degree of the throttle valve within a predetermined range, the maximum opening value of which is lower than that at which the control circuit induces a downshift from a predetermined gear ratio to the next lower one, (c) issuing a downshift command to the transmission to cause a downshift from the predetermined gear ratio to the next lower one upon the load on the engine increasing to a level whereat the preselected target vehicle speed cannot be maintained without opening the throttle valve beyond the maximum opening value, and maintaining the downshift condition until a predetermined phenomenon occurs.

BRIEF DESCRIPTION OF THE DRAWINGS

The features and advantages of the arrangement of the present invention will become more clearly appreciated from the following description taken in conjunction with the accompanying drawings in which:

FIG. 3 is a chart showing, in terms of throttle valve opening and time, the third/fourth speed hunting phenomenon which plagues the FIG. 1 arrangement;

FIG. 4 is a schematic diagram of a transmission control system according to a first embodiment of the present invention;

DETAILED DESCRIPTION OF THE PREFERRED EMBODIMENTS

FIG. 4 shows, in schematic form a transmission system which is equipped with a first embodiment of the present invention. This system includes a vehicle speed sensor 10 which is capable of generating a vehicle speed signal. This device may take the form of a sensor which outputs an electrical signal indicative of vehicle speed. (preferred in this instance due to the ease with which it can be used in conjunction with an electronic control device such as a microprocessor) or alternatively the governor valve of the transmission 12 which of course outputs a hydraulic signal the pressure of which varies with vehicle speed. The system further includes a load sensor 14. This sensor may take the form an device which is connected with the engine throttle valve 16 in a manner to output an electrical signal which indicates the throttle position (again preferred due to the ease of use with electronic control apparatus) or alternatively take the form of transmission throttle valve which outputs a corresponding hydraulic signal.

Figure 1:
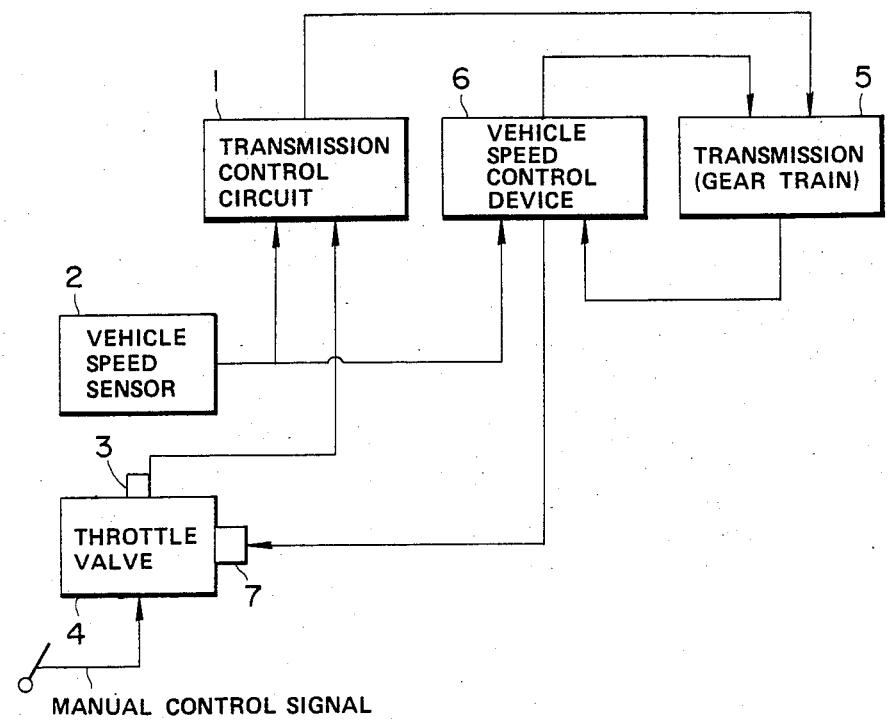
FIG. 1 is a schematic diagram showing the prior art transmission control system discussed briefly in the opening paragraphs of the present disclosure.
Figure 2:
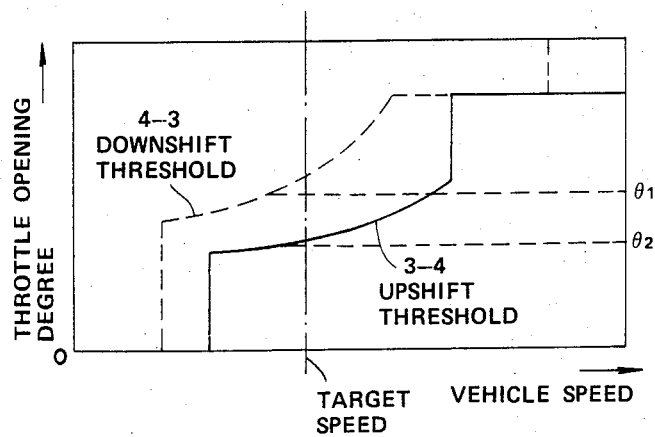
FIG. 2 shows, in terms of throttle valve opening and vehicle speed, the 3-4 upshift and 4-3 downshift patterns or schedules according to which the transmission control circuit of the FIG. 1 system controls the transmission.

In this embodiment the gear train or transmission 12 per se of the system takes the form of a four forward speed planetary gear transmission. Operatively connected with the transmission in a well known manner is a transmission control circuit 20. In this embodiment the control circuit takes the form a hydraulic spool valve system which is arranged to selectively control the supply of hydraulic pressure to the brakes and clutches associated with the planetary gear train. This control circuit is arranged to control the shifting of transmission 12 in accordance with a control schedule of the nature shown in FIG. 2. An example of the above type of transmission control circuit is disclosed in copending U.S. patent application Ser. No. 518,413 filed in July 29, 1983 now U.S. Pat. No. 4,563,918 in the name of Sugano (or the corresponding European Patent Application No. 83107503.1 filed in July 29, 1983 by Nissan Motor Co. The content of this document is hereby incorporated by reference thereto. For further disclosure relating to transmission control circuits including overdrive controls, reference may be had to "Nissan OD type Automatic Transmission (L4N71B, E4N71B)" published in November 1982.

The system further includes an automatic vehicle speed control device (ASCD) 22. This device receives inputs from the vehicle speed and throttle valve position sensors 10, 14 as shown. This unit 22 is arranged to control (during the cruise control mode of operation) the operation of (a) an actuator 24 which controls the position of the throttle valve 16 in place of the manual control signal derived via depression of the accelerator pedal 26 and (b) a solenoid valve 28 which when energized induces a 4-3 downshift and maintains same until de-energized. An example of the above mentioned solenoid valve (viz., valve 28) may found in the above mentioned U.S. patent application Ser. No. 518,413 in connection with element 42 disclosed therein. An example of the above mentioned actuator may be found on page 117 of the Nissan Service Journal No. 429 published in November 1980.

In this embodiment the automatic vehicle speed control device 22 is arranged to control the movement of the throttle valve 16 within a range which is determined in accordance with the selected cruising speed and the opening degree at which a 4-3 downshift will occur at said speed. Viz., the automatic vehicle speed control device operates an actuator 24 so as to not open the throttle valve 16 beyond an angle $\theta_1$ (see FIG. 2) which is selected to be slightly below that which will induce a 4-3 downshift just below the selected cruising speed. This control is maintained until a manual command is produced by depressing the accelerator pedal 26 sufficiently to open the throttle valve 16 beyond $\theta_1$ or the cruise control is otherwise cancelled by the driver.

Since approximately 80% of the torque of the engine can be produced with the engine throttle valve 16 opened approximately half way, if $\theta_1$ is selected be in excess of half open, then sufficient engine torque will normally be available during the cruise control mode.

However, should the load on the vehicle increase to the point that the desired cruising speed cannot be maintained under cruise control without opening the throttle valve beyond the $\theta_1$, the automatic vehicle speed control device 22 energizes the 4-3 downshift control solenoid valve 28 to produce the necessary downshift. It will be noted that due to the limit that the throttle valve 16 is opened under this mode of operation, the vehicle speed control unit 22 exclusively controls this downshift. Viz., the transmission control circuit 20 is actually prevented from being involved in the downshift decision and thus renders it possible to operate both devices according to a relatively simple control schedule.

After a downshift a timer 30 included in the speed control unit 22 is triggered and a subsequent upshift inhibited for a preselected period of approximately 10 to 20 seconds.

The operation of the first embodiment may be placed under the control of a microprocessor or like circuit (incorporated in the vehicle speed control unit 22) which is programmed in a manner that the steps set forth hereinlater are executed.

Figure 5:
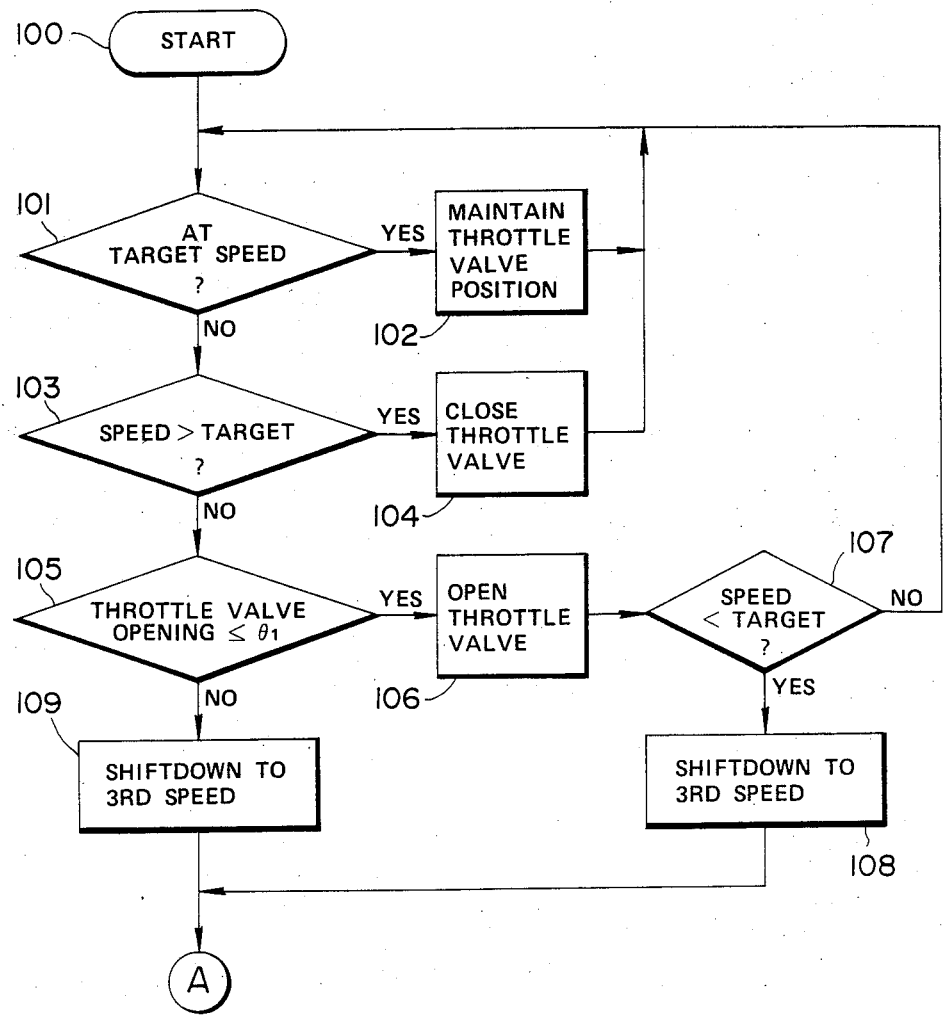
FIGS. 5 and 6 show a flow chart illustrating the steps which characterize the operation of a first embodiment of the present invention.
Figure 6:
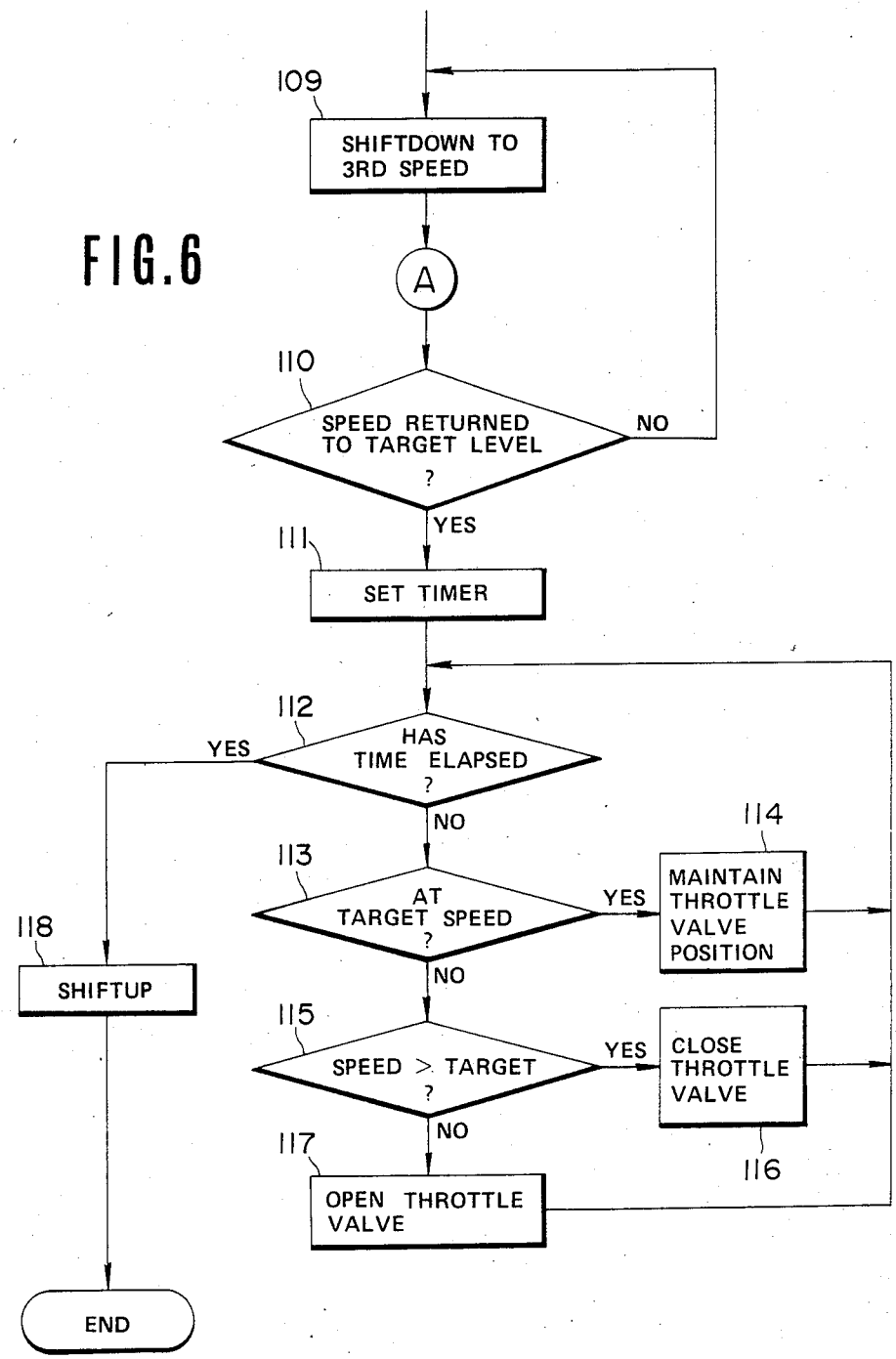

FIGS. 5 and 6 show a flow chart which illustrates the control process which characterizes the operation of the first embodiment.

As shown in FIG. 5, subsequent to START (step 100) an enquiry is made (step 101) as to whether the vehicle speed is at the selected cruising speed. If the result of this enquiry is YES then the program proceeds to step 102 wherein the decision is made to maintain the engine throttle valve in its present position and the program recycles. However, if the vehicle speed is not within the previously mentioned narrow range, then at step 103 the enquiry is made as to whether the vehicle speed is greater than the target level. If the outcome of this enquiry is YES, then a command to close the throttle valve (e.g. by a predetermined increment) is issued (step 104) and the program recycles to the start. However, if the vehicle speed is lower than the target level, then the program proceeds to step 105 wherein it is ascertained if the engine throttle valve opening degree is equal to or less than a predetermined limit $\theta_1$.

If the outcome of this enquiry reveals that the throttle valve is not opened to the $\theta_1$ limit, then at step 106 the automatic speed control device issues a signal which causes actuator 24 to open throttle valve 16 by a predetermined increment. Subsequently, in step 107 the actual vehicle speed is compared with the target value. If the outcome of this comparison reveals that the vehicle speed is not below the target level, the program recycles to the start. However, in the event that the vehicle speed has fallen below the desired or target level the automatic vehicle speed control device issues an energizing signal to solenoid valve 28 (step 108) and thus induces a 4–3 downshift of the transmission.

On the other hand, if the outcome of the enquiry performed in step 105 indicates that the throttle valve opening is not within the $\theta_1$ limit (viz., is opened fractionally beyond said limit), then at step 109 the command to shiftdown is issued. Viz., the solenoid valve 28 is energized.

Once the transmission has been downshifted, the operation proceeds as shown in FIG. 6. Viz., at step 110 it is determined if the vehicle speed has returned to the desired cruising level or not. If the outcome of this determination indicates that the vehicle speed is still below the target level then the program recycles to a point immediately prior step 109 and thus maintains the transmission in the downshifted state. However, if due to the downshift the vehicle speed has in fact increased to the target level then at step 111 timer 30 is set. This holds the downshift for a preselected period of time (10-20 seconds for example). At step 112 it is ascertained if the preselected period of time has elapsed or not. In the event that the timer is still running, the program proceeds to step 113 wherein it is determined if the vehcle speed is at the target level. If the answer to this question is YES then at step 114 the decision to maintain the throttle valve in its present position is made and the program recycles to step 112. However, if the vehicle is not running at the target speed, then at step 115 it is determined if the speed is greater than the target level. If in fact the vehicle speed has increased above the desired level, the command is issued in step 116 to close the throttle valve (by a predetermined increment for example) and the program recycles to step 112. On the other hand, if the vehicle speed is lower than the target level then at step 117 the command to open the throttle valve (by a predetermined increment for example) is issued and the program recycles to step 112.

Upon the expiry of the predetermined time period the command to upshift the transmission is issued at step 118 and the program terminates.

As will be appreciated until it is absolutely necessary to open the throttle fractionally beyond the predetermined limit ($\theta_1$) the transmission is held in OD (4th speed). Further, by appropriately selecting $\theta_1$ it is possible to have the decision to shiftdown controlled exclusively by the vehicle speed control thus enabling a simple control schedule.

Figure 7:
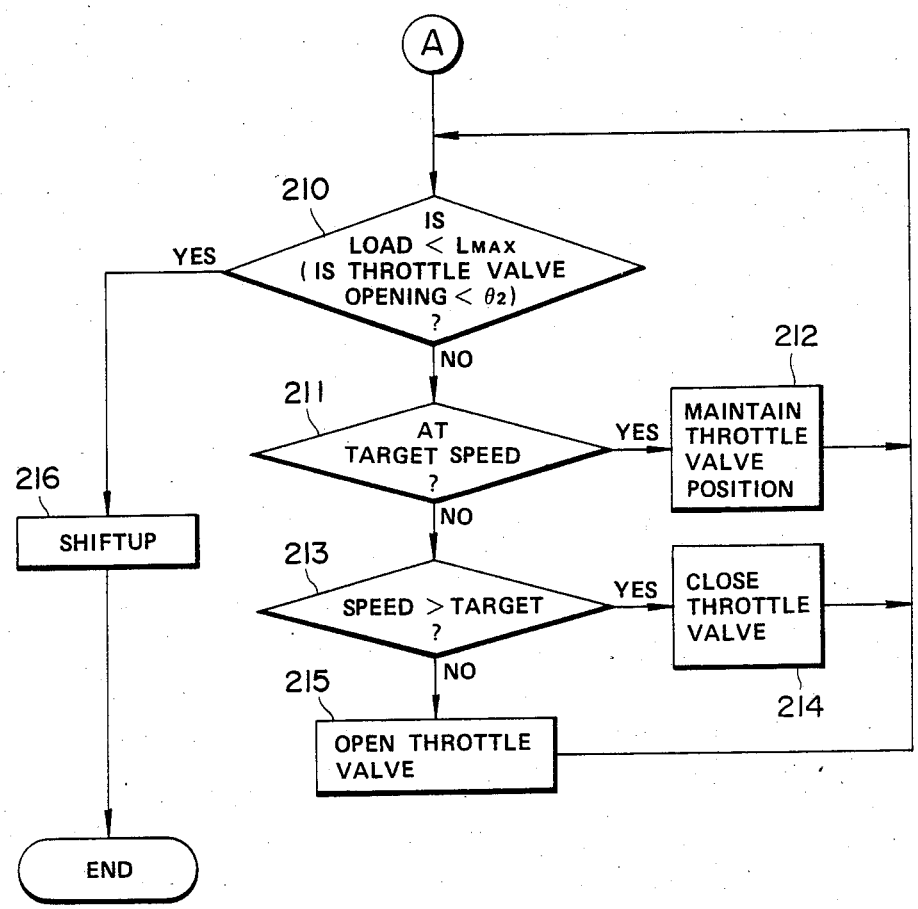
FIG. 7 shows a portion of a flow chart which illustrates the steps which characterize the operation of a second embodiment of the present invention.

FIG. 7 shows a portion of a flow chart which continues on from that shown in FIG. 5 and which demonstrates the operations which characterize a second embodiment of the present invention.

In this embodiment, at step 210, it is determined if the vehicle and therefore the engine of the vehicle is subject to a load less than a maximum load ($L_{MAX}$) which can be tolerated while the vehicle is running in OD with the throttle opened to $\theta_1$. That is to say, it is determined if the vehicle is running in 3rd speed with the throttle not opened more than a second predetermined angle $\theta_2$. As will be appreciated from FIG. 2, $\theta_2$ is less than $\theta_1$ and is so selected that that when the engine is operated at this limit, the torque produced by the engine is essentially equal to that produced when the engine is operated with the throttle valve at $\theta_1$ and with the transmission in 4th speed (OD). Accordingly, if the throttle valve need not be opened beyond $\theta_2$ then it is permissible to upshift and open the throttle.

By this method it is possible to entirely eliminate the hunting problem in that until the load that induced the downshifting disappears a subsequent upshift is inhibited.

The subsequent steps 211 to 216 correspond to steps 113 to 118 respectively of FIG. 6 so that further description of same will be omitted for brevity.

As will be appreciated, even though one full run of the above described programs is apt to take a considerable time, a hard wire interrupt may be performed at regular intervals to allow other control programs to be run without consuming excessive amounts of CPU time.

It will be also noted that even though the FIG. 4 arrangement shows the transmission control circuit and the automatic vehicle speed control device using the same vehicle speed and load signals, it is possible that that the transmission control circuit use the governor and throttle pressures inherently provided therein while the vehicle speed control unit receive electrical signals from independent sources, as long no notable deviation occurs between the corresponding signals.

What is claimed is:

1. A method of automatically controlling the speed of an automotive vehicle having an engine and a transmission and a transmission control circuit, at a preselected target value, comprising the steps of:

(a) using a vehicle speed control device to vary the opening degree of a throttle valve associated with said engine in a manner to maintain said preselected target speed;

(b) limiting the degree to which said vehicle speed control device opens said throttle valve to a predetermined maximum opening value which is less than that which will cause the transmission control circuit of said transmission to induce a downshift if the vehicle speed falls below said target level;

(c) using said vehicle speed control device to induce a downshift from a predetermined gear ratio to the next lower one, if the load on said engine increases to a level whereat the vehicle speed cannot be maintained at said target speed without opening said throttle valve beyond said maximum opening value; and (d) maintaining said downshift until a predetermined phenomenon occurs.

2. A method as claimed in claim 1, wherein said step of maintaining said downshift includes holding said downshift for a predetermined period of time after said downshift occurs and the vehicle speed returns at least to said target value.

3. A method as claimed in claim 1, wherein said step of maintaining said downshift includes holding said downshift until the load on said engine which induced said downshift reduces to a level whereat said said target speed can be maintained in said next lower gear ratio without opening said throttle beyond a second predetermined limit which second predetermined limit is selected such that said engine produces the same amount of torque in said next lower gear ratio with said throttle opened to said second predetermined limit as it does when it is operated in said predetermined gear ratio with said throttle opened to said maximum opening value.

4. In an automotive vehicle
an engine having a throttle valve;
a throttle valve position sensor for generating a first signal indicative of the position of said throttle valve;
a vehicle speed sensor for generating a second signal indicative of the speed of the vehicle;
an automatic transmission having a plurality of forward speed ratios and a control circuit which controls the shifting between said plurality of forward speeds in response to said first and second signals; and
selectively operable vehicle speed control means which is responsive to said first and second signals for:

(a) moving said throttle valve in a manner to maintain the vehicle speed essentially constant at a preselected target speed, (b) maintaining the opening degree of said throttle valve within a predetermined range, the maximum opening value of which is lower than that at which said control circuit induces a downshift from a predetermined gear ratio to the next lower one;

(c) issuing a downshift command to said transmission to cause a downshift from said predetermined gear ratio to the next lower one upon the load on said engine increasing to a level whereat said preselected target vehicle speed cannot be maintained without opening said throttle valve beyond said maximum opening value, and maintaining said downshift condition until a predetermined phenomenon occurs.

5. A vehicle as claimed in claim 4, wherein said transmission includes a solenoid valve which when energized induces said downshift from said predetermined gear ratio to said next lower gear ratio and inhibits the upshift from said next lower gear ratio to said predetermined one while energized, said solenoid valve being connected to said vehicle speed control device so as to be energized by said downshift command.

6. A vehicle as claimed in claim 4, wherein said transmission takes the form of a four forward speed transmission wherein said fourth speed is an overdrive ratio and wherein said predetermined gear ratio is said fourth speed ratio.

7. A vehicle as claimed in claim 4, wherein said predetermined phenomenon is the expiry of a predetermined time from the time of downshift.

8. A vehicle as claimed in claim 4, wherein said predetermined phenomenon is the reduction of the load on said engine to a level whereat said preselected vehicle speed can be maintained in said next lower gear ratio without opening said throttle valve beyond a second predetermined limit which second predetermined limit is selected such that when said engine operates in said next lower gear ratio with said throttle valve at said second predetermined limit, the engine produces the same amount of torque as when it operates in said predetermined gear ratio with said throttle opened to said maximum opening value.

9. A method of automatically controlling the speed of an automotive vehicle having an engine including a throttle valve and a multi-speed transmission having a transmission control circuit, at a preselected target value, comprising the steps of:

producing first and second signals indicative of the opening degree of said throttle valve and vehicle speed respectively;

controlling the upshifting and downshifting of said transmission in accordance with said first and second signals;

selecting a target speed;

using vehicle speed control means which includes a throttle valve actuator to vary the opening degree of said throttle valve associated with said engine in a manner to maintain said preselected target speed;

limiting the degree to which said vehicle speed control means opens said throttle valve to a predetermined maximum opening value which is less than that which will cause said first signal to assume a value at which the transmission control circuit of said transmission will induce a downshift if the vehicle speed falls below said target speed;

using said vehicle speed control means to induce a downshift from a predetermined gear ratio to the next lower one, if the load on said engine increases to a level whereat the vehicle speed cannot be maintained at said target speed without opening said throttle valve beyond said maximum opening value; and maintaining said downshift until one of:

(a) the expiry of a predetermined period of time after said downshift occurs and the vehicle speed returns at least to said target value, and (b) the load which induced said downshift reduces to a level whereat said target speed can be maintained in said next lower gear ratio without opening said throttle valve beyond a second predetermined limit which second predetermined limit is selected such that said engine produces the same amount of torque in said next lower gear ratio with said throttle opened to said second predetermined limit as it does when it is operated in said predetermined gear ratio with said throttle opened to said maximum opening value.

10. In an automotive vehicle:

an engine having a throttle valve;

a throttle actuator for selectively controlling the position of said throttle valve;

a throttle valve position sensor for generating a first signal indicative of the position of said throttle valve;

a vehicle speed sensor for generating a second signal indicative of the speed of said vehicle;

an automatic transmission having a plurality of forward speed ratios and a control circuit which controls the shifting between said plurality of forward speeds in response to said first and second signals; and selectively operable valve speed control means which is responsive to said first and second signals for:

(a) inducing said throttle actuator to move said throttle valve in a manner to maintain the vehicle speed essentially constant at a preselected target speed, (b) inducing said throttle actuator to maintain the opening degree of said throttle valve within a predetermined range, the maximum opening value of which is lower than that at which said control circuit induces a downshift from a predetermined gear ratio to the next lower one, (c) issuing a downshift command to said transmission to cause a downshift from said predetermined gear ratio to the next lower one upon the load on said engine increasing to a level whereat said preselected target vehicle speed cannot be maintained without opening said throttle valve beyond said maximum opening value, and maintaining said downshift condition until one of:

(a) the expiry of a predetermined period of time after said downshift occurs and the vehicle speed returns at least to said target value, and (b) the load which induces said downshift reduces to a level whereat said target speed can be maintained in said next lower gear ratio without opening said throttle valve beyond a second predetermined limit which second predetermined limit is selected such that said engine produces the same amount of torque in said next lower gear ratio with said throttle opened to said second predetermined limit as it does when it is operated in said predetermined gear ratio with said throttle opened to said maximum opening value.

* * * * *